United States Patent
Hoffmann (10) Patent No.: US 8,353,667 B2
(45) Date of Patent: Jan. 15, 2013

(54) METHOD AND APPARATUS FOR ADJUSTING A YAW ANGLE OF A WIND TURBINE

(75) Inventor: Till Hoffmann, Osnabrück (DE)

(73) Assignee: General Electric Company, Schenectady, NY (US)

( * ) Notice: Subject to any disclaimer, the term of this patent is extended or adjusted under 35 U.S.C. 154(b) by 1109 days.

(21) Appl. No.: 12/199,052

(22) Filed: Aug. 27, 2008

(65) Prior Publication Data

US 2010/0054939 A1     Mar. 4, 2010

(51) Int. Cl.
*B63H 3/00* (2006.01)
(52) U.S. Cl. .................................. 416/37; 416/41
(58) Field of Classification Search ............. 415/4.1, 415/4.3, 4.5, 908; 416/25, 37, 41, 61, 27, 416/147
See application file for complete search history.

(56) References Cited

U.S. PATENT DOCUMENTS

| | | | | |
|---|---|---|---|---|
| 4,966,525 A * | 10/1990 | Nielsen | ............... | 416/9 |
| 6,441,507 B1 * | 8/2002 | Deering et al. | ............... | 290/44 |
| 7,004,724 B2 | 2/2006 | Pierce et al. | | |
| 7,118,339 B2 * | 10/2006 | Moroz et al. | ............... | 416/1 |
| 7,118,399 B1 | 10/2006 | Wen et al. | | |
| 2004/0081551 A1 * | 4/2004 | Wobben | ............... | 415/4.1 |

FOREIGN PATENT DOCUMENTS

| | | |
|---|---|---|
| DE | 197 39 162 A1 | 3/1999 |
| EP | 1 890 034 A1 | 2/2008 |

OTHER PUBLICATIONS

European Search Report issued in connection with EP Patent Application No. 09167788.0, Jan. 25, 2012.

* cited by examiner

*Primary Examiner* — Jenny L Wagner
*Assistant Examiner* — Mark Tornow
(74) *Attorney, Agent, or Firm* — Global Patent Organization; Douglas D. Zhang (57) ABSTRACT

A method and an apparatus for adjusting a yaw angle of a wind turbine comprising a rotor having a plurality of rotor blades and a hub are provided. The method is adapted for adjusting the yaw angle from an actual yaw angle to a desired yaw angle and comprises the steps of measuring a wind direction at the location of the wind turbine, measuring the yaw angle of the wind turbine and/or determining a wind direction relative to the nacelle orientation, calculating a pitch angle of at least one rotor blade as a function of the measured wind direction and the measured yaw angle and/or the wind direction relative to the nacelle orientation, and adjusting the pitch angle of the rotor blades according to the calculated pitch angle such that a yaw momentum is generated for changing the yaw angle from the actual yaw angle to the desired yaw angle.

13 Claims, 6 Drawing Sheets

METHOD AND APPARATUS FOR ADJUSTING A YAW ANGLE OF A WIND TURBINE

BACKGROUND OF THE INVENTION

The present invention relates to wind turbines including a rotor having a plurality of rotor blades attached to a hub, and especially relates to a method and an apparatus for adjusting a yaw angle of a wind turbine with respect to the wind direction at the location of the wind turbine.

Conventionally a wind turbine includes yaw brake control units and yaw motor control units in order to provide yaw brake driver signals and yaw motor driver signals which are used to adjust, in cooperation with a yaw angle adjustment unit, the yaw angle of the entire wind turbine. Furthermore wind turbines include yaw momentum sensors in order to measure a yaw momentum of the wind turbine. These kind of measurements usually are carried out in order to reduce the load on different components like main shaft and hub by adding interdependent or independent pitch offsets to each rotor blade. In order to reduce the load most effectively the yawing momentum is controlled to zero by adjusting the yaw angle of the wind turbine using the yaw angle adjustment unit.

Wind turbines are of increasing importance as an environmentally safe and relatively inexpensive energy source. Thus an increased demand for an improved wind turbine performance has let to efforts concerning an optimum adjustment of the yaw angle with respect to the wind direction at the location of the wind turbine. As the wind direction at the location of the wind turbine may rapidly change, the yaw adjustment unit has to provide a reliable adjustment of the yaw angle even for a varying wind direction. Wind turbines include actuator devices such as yaw motors and yaw brakes in order to rotate a machine nacelle with respect to the wind direction at the location of the wind turbine. This kind of actuator devices are usually large electrical drives with gear boxes. These systems are complicated and expensive because they have to provide a torque required to orientate the wind turbine towards the incoming wind direction.

SUMMARY OF THE INVENTION

According to a first aspect of the invention a method is provided for adjusting a yaw angle of a wind turbine from an actual yaw angle to a desired yaw angle, wherein the wind turbine includes a rotor having at least one rotor blade attached to a hub, the method including measuring a wind direction at the location of the wind turbine, measuring the yaw angle of the wind turbine and/or a wind direction relative to the nacelle orientation, calculating a pitch angle of the at least one rotor blade as a function of the measured wind direction and the measured yaw angle and/or a wind direction relative to the nacelle orientation, and adjusting the pitch angle of the at least one rotor blade according to the calculated pitch angle such that a yaw momentum is generated for changing the yaw angle from the actual yaw angle to the desired yaw angle.

According to a second aspect of the present invention a method is provided for adjusting a yaw angle of a wind turbine from an actual yaw angle to a desired yaw angle, wherein the wind turbine includes a rotor having a plurality of rotor blades attached to a hub, the method including measuring a wind direction at the location of the wind turbine, measuring the yaw angle of the wind turbine and/or a wind direction relative to the nacelle orientation, calculating a set signal for a yaw angle modification as a function of the measured wind direction and the measured yaw angle and/or a wind direction relative to the nacelle orientation, measuring a yaw momentum of the wind turbine, calculating a pitch angle of the rotor blades as a function of the set signal and the measured yaw momentum, and adjusting the pitch angle of the rotor blades according to the calculated pitch angle such that a yaw momentum is generated for changing the yaw angle from the actual yaw angle to the desired yaw angle.

According to a third aspect of the present invention a wind turbine is provided including a rotor having a plurality of rotor blades attached to a hub, said wind turbine further including a sensor device adapted to measure a wind direction at the location of the wind turbine, a first processing unit for calculating a set signal for a yaw angle modification from an actual yaw angle to a desired yaw angle as a function of the measured wind direction and the actual yaw angle and/or a wind direction relative to the nacelle orientation, and an actuator device adapted to adjust a pitch angle of at least one of the plurality of rotor blades as a function of the set signal such that a yaw momentum is generated for changing the yaw angle from the actual yaw angle to the desired yaw angle.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

In view of the above, a method and an apparatus for adjusting the yaw angle of a wind turbine are provided. At the location of the wind turbine the wind direction is measured by means of a wind direction sensor provided at the wind turbine, a yaw angle of the wind turbine is measured by means of a yaw angle sensor provided at the wind turbine, and a pitch angle control signal for controlling a pitch angle of at least one rotor blade at a function of the measured wind direction and the measured yaw angle is calculated by means of a processing unit such that a yaw momentum is generated for changing the measured yaw angle as a function of the measured wind direction and of the measured yaw angle.

Using this pitch control signal a pitch angle of the rotor blades can be adjusted. Thus a defined yaw momentum offset may be used to support the yaw angle adjustment unit of an actuator device of the wind turbine in adjusting the yaw angle. In order to provide such kind of yaw momentum offsets, interdependent pitch offsets to each blade are added. Negative or positive yaw moments can be applied in order to support both yaw directions. It is thus an advantage that the actuator device including yaw brakes and yaw motors as well as gear boxes and gear rings can be designed with components which consume less power and therefore are less expensive.

According to the gist idea of the invention the method includes the steps of (i) measuring an actual yaw momentum, (ii) controlling the yaw momentum to zero, and (iii) in case of a desired change in yaw position, controlling the yaw momentum to a different set point that is suited to support the yaw drives by means of an interdependent pitch offset.

Figure 1:
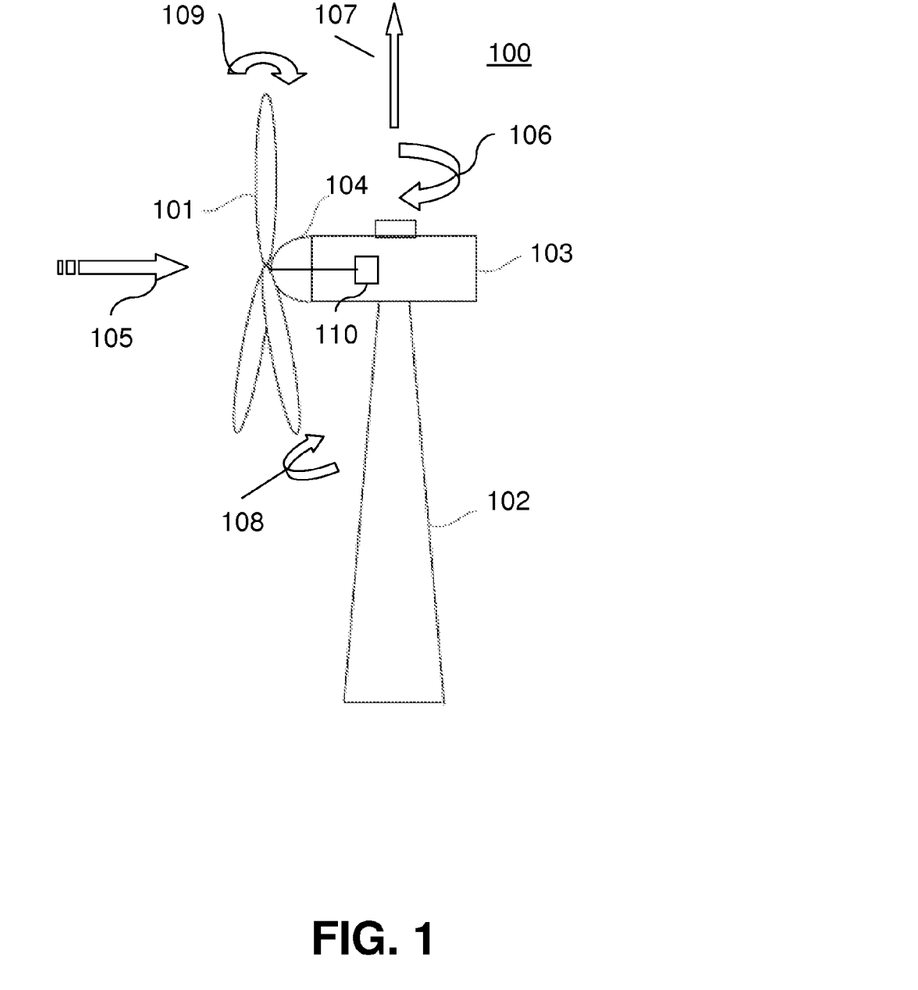
FIG. 1 shows a schematic side view of a wind turbine oriented with respect to an incoming wind direction at the location of the wind turbine.

FIG. 1 is a schematic view of a wind turbine 100 having a machine nacelle 103, which is rotatably mounted on top of a tubular tower 102. The wind turbine 100 further includes a rotor having a hub 104 and three rotor blades 101. The hub 104 is the central part of the rotor and the rotor blades 101 extend outwardly from the hub. Although the wind turbine 100 illustrated in FIG. 1 includes three rotor blades 101, any number of rotor blades 101 may be provided. The nacelle 103 which is located on top of the tubular tower 102 can be rotated about a central axis of the tubular tower 102. The orientation of the machine nacelle 103 with respect to the central axis of the tubular tower 102 is referred to as the yaw angle 106 which is further elucidated in FIG. 2 below. Depending on the orientation of the nacelle 103 with respect to the incoming wind direction 105 a yaw momentum 107 is applied to the wind turbine, especially to the rotor and the nacelle 103. The yaw momentum 107 drives the machine nacelle 103 in a direction such that the axis of the main shaft of the rotor may be oriented towards the incoming wind direction 105. It is noted that the yaw momentum 107 is referred to in a vector representation such that the momentum acts about the central axis of the tubular tower 102.

Figure 2:
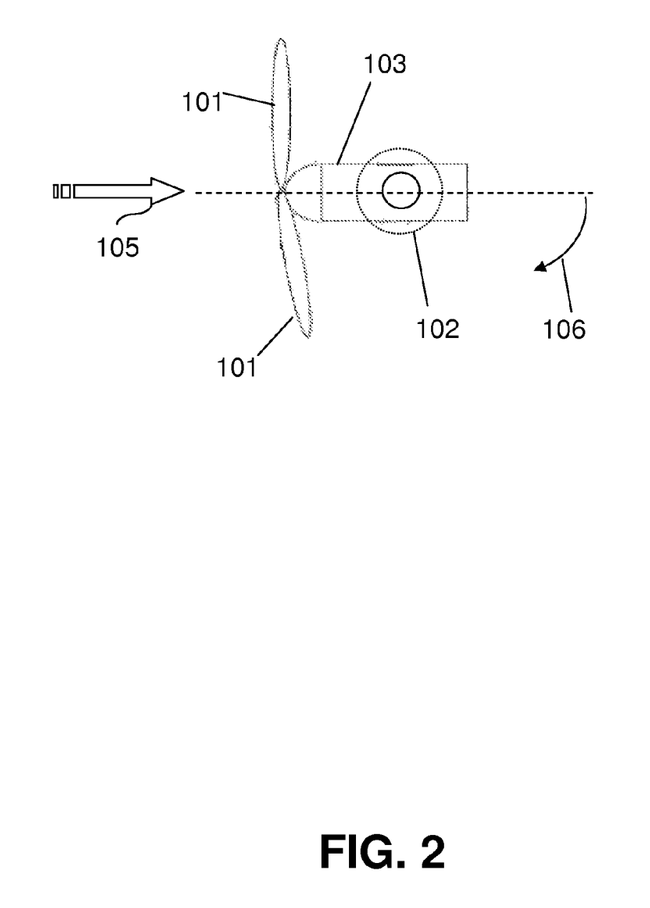
FIG. 2 is a schematic top view of a wind turbine indicating a yaw angle.

FIG. 2 is a schematic top view of the wind turbine 100 indicating the yaw angle 106 which this case is exemplary measured from an axis of the incoming wind direction 105. If the machine nacelle 103 is rotated the yaw angle 106 may be changed.

A pitch angle 108 of at least one rotor blade 101 is controlled according to the method disclosed. It is noted that reference numeral 108 in FIG. 1 is related to the rotation of a rotor blade 101 about its longitudinal axis. Furthermore, as will be described herein below, a pitching momentum 109 of the wind turbine may be compensated for by the adjustment of the pitch angle 108 of at least one of the plurality of rotor blades 101. A rotation sensor 110 is mounted on the axis of the rotor in order to be able to adjust the pitch angle 108 with respect to a given rotational position of the rotor.

Figure 3:
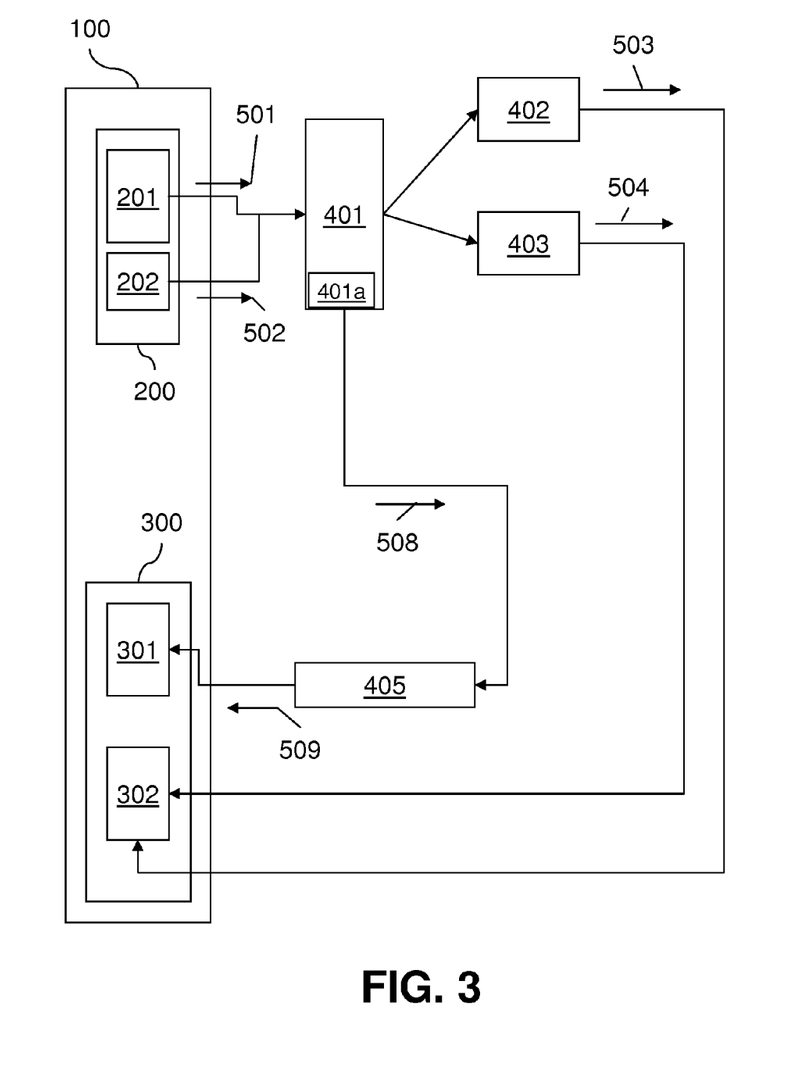
FIG. 3 a block diagram of an apparatus for controlling a yaw angle of the wind turbine with respect to an incoming wind direction by means of an adjustment of the pitch angle of rotor blades.

FIG. 3 is a block diagram of an apparatus for adjusting the yaw angle of a wind turbine according to a first embodiment. As shown in FIG. 3, the wind turbine 100 includes a sensor device 200 and an actuator device 300. The sensor device 200 of the wind turbine 100 shown in FIG. 3 includes a wind direction sensor 201 and a yaw angle sensor 202 provided at the wind turbine 100. The wind direction sensor 201 provides a wind direction signal 501 wherein the yaw angle sensor 202 provides a yaw angle signal 502. The wind direction signal 501 and the yaw angle signal 502 are supplied to a first processing unit 401 which processes the input signals.

The first processing unit 401 provides driver signals for a yaw brake control unit 402 and a yaw motor control unit 403. These control units are used for an adjustment of the yaw angle of the wind turbine. In order to provide an adjustment of the yaw angle, the yaw brake control unit 402 outputs a yaw brake driver signal 503 wherein the yaw motor control unit outputs a yaw motor driver signal 504. Both signals 503 and 504 are supplied to a yaw angle adjustment unit 302 provided in the actuator device 300 of the wind turbine 100. The actuator device 300 is used for adjusting the yaw angle with respect to the incoming wind direction 105 (FIG. 1).

Furthermore the first processing unit 401 comprises a yaw speed controller 401a which is used to control the speed at which the yaw angle 106 is modified. In addition to that the yaw momentum 107 is controlled as a function of an actual yaw speed at which the yaw angle is modified, by using a yaw speed controller.

According an embodiment the step of calculating the pitch angle control signal for controlling the pitch angle of the at least one rotor blade in order to change the yaw angle is based on the predetermination of an angle difference between the measured wind direction and the measured yaw angle.

According to another embodiment the adjustment of the pitch angle of the at least one rotor blade is dependent on the rotational position of the rotor blade.

As yaw moments 107 (FIG. 1) may be very large, the yaw angle adjustment unit 302 of the actuator device 300 of conventional wind turbines is very expensive, because large torques have to be provided. The apparatus for adjusting the yaw angle of a wind turbine according to this embodiment has the advantage, that in addition to, or instead of, the yaw angle adjustment unit 302 a pitch angle adjustment unit 301 of the actuator device 300 of the wind turbine 100 is used to introduce a yaw momentum 107 by controlling the pitch angle 108 of at least one rotor blade 101 (see FIG. 1). It is noted that reference numeral 108 in FIG. 1 is related to the rotation of a rotor blade 101 about the longitudinal axis of the rotor blade 101 (the axis of the rotor blades 101 is not shown in FIG. 1).

Thus by adjusting the pitch angle of one or more rotor blades of the plurality of rotor blades it is possible to provide different flow resistances with respect to the incoming wind at different rotational positions. This results in a momentum 107 which gives rise to the change of the yaw angle 106.

The yaw angle adjustment unit 302 of the actuator device 300 is used to adjust the yaw angle 106 even in the absence of a yaw momentum 107 such that the axis of the rotor of the wind turbine 100 may be directed towards the incoming wind direction 105. If an additional yaw momentum 107 is provided by an appropriate pitch angle adjustment, the yaw angle adjustment unit 302 may be driven with less driving energy.

To this end, as shown in FIG. 3, the first processing unit 401 outputs a pitch angle control signal 508 which is supplied to a pitch control unit 405. The pitch control unit 405 provides a pitch angle driver signal 509 for the pitch angle adjustment unit 301. It is noted that the pitch angle adjustment may be different for each rotor blade 101 and also may be different at different rotational positions of each individual rotor blade 101. The rotational positions of the rotor blades 101 may be determined by using a rotation sensor 110 mounted on the axis of the rotor.

According to yet another embodiment the adjustment of the pitch angle of the plurality of rotor blades is performed independently for each rotor blade. Furthermore it may be an advantage that the adjustment of the pitch angle of the at least one rotor blade is dependent on the rotational position of the rotor blade.

Figure 4:
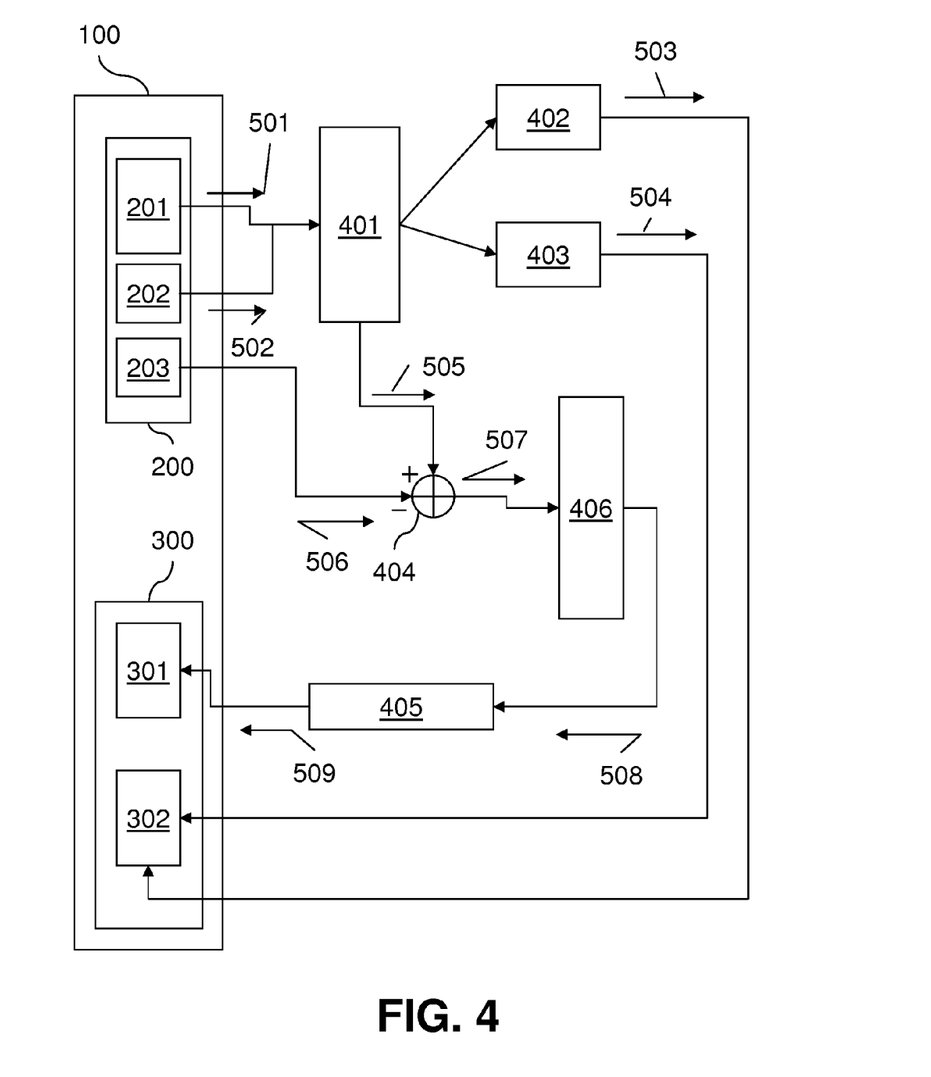
FIG. 4 a block diagram of an apparatus for controlling a yaw angle of a wind turbine with respect to the incoming wind direction by adjusting the pitch angle of rotor blades as a function of wind direction and yaw momentum.

FIG. 4 is a block diagram of an apparatus for controlling a yaw angle of a wind turbine with respect to the incoming wind direction by adjusting the pitch angle of rotor blades as a function of wind direction according to a second embodiment. In addition to the apparatus shown in FIG. 3 the adjustment apparatus of FIG. 4 includes a second processing unit 406 which is used to provide the pitch angle control signal 508 for the pitch control unit 405. It is noted that components which have been described already with reference to FIG. 3 are not described again in order to avoid a redundant description.

As shown in FIG. 4, the wind turbine 100 according to the second embodiment of this embodiment includes a modified sensor device 200, wherein in addition to the wind direction sensor 201 and the yaw angle sensor 202 a yaw momentum sensor 203 is provided. The yaw momentum sensor 203 outputs a yaw momentum signal 506 which is supplied to a signal adding unit 404. In the apparatus shown in FIG. 4 the first processing unit 401 calculates a set signal 505 as a function of the wind direction signal 501 and the yaw angle signal 502 input into the first processing unit 401. This set signal 505 is dependent on a difference between the actual wind direction 105 (FIG. 1) and the yaw angle signal 502 provided by the yaw angle sensor 202.

The yaw angle signal 502 represents the actual yaw angle of the wind turbine 100. The set signal 505 corresponds to a set momentum which would be appropriate in the absence of a yaw momentum caused by the wind at the location of the wind turbine 100. If a yaw momentum is measured by the yaw momentum sensor 203 of the sensor device 200, this momentum may be subtracted from the momentum represented by the set signal 505. Thus the different signal 507 (difference momentum signal) is supplied to the second processing unit 406 which provides the pitch angle control signal 508 such that, via the pitch control unit 405, a pitch angle driver signal 509 can be provided in order to provide a pitch angle adjustment such that the machine nacelle 103 of the wind turbine 100 is rotated with respect to the wind direction 105.

According to yet another embodiment the step of calculating the set signal for the yaw angle modification is based on the determination of an angle difference between the measured wind direction and the measured yaw angle. Typically the step of calculating the set signal for the yaw angle modification and the step of calculating the pitch angle of the rotor blades as a function of the set signal and the measured yaw momentum are performed by means of the same processing unit.

Typically the second processing unit 406 is adapted to calculate the pitch angle control signals 508 for the pitch adjustment as a function of the set signal 505 and the measured yaw momentum, i.e. the yaw momentum signal 506.

According to yet another embodiment the pitch control unit 405 is adapted to supply the pitch angle driver signal 509 to the pitch angle adjustment 301 of the actuator device 300 in order to control the pitch angle 108 of the rotor blades 101. It is noted that this embodiment is not restricted to the pitch angle control of a specific rotor blade, i.e. one or more of the plurality of rotor blades 101 may be controlled in order to provide a yaw momentum 107 which can change the yaw angle 106.

According to yet another embodiment the actuator device 300 further includes the yaw angle adjustment unit 302 which is adapted to adjust the yaw angle 106 in cooperation with the actual yaw momentum measured by the yaw momentum sensor 203.

Figure 5:
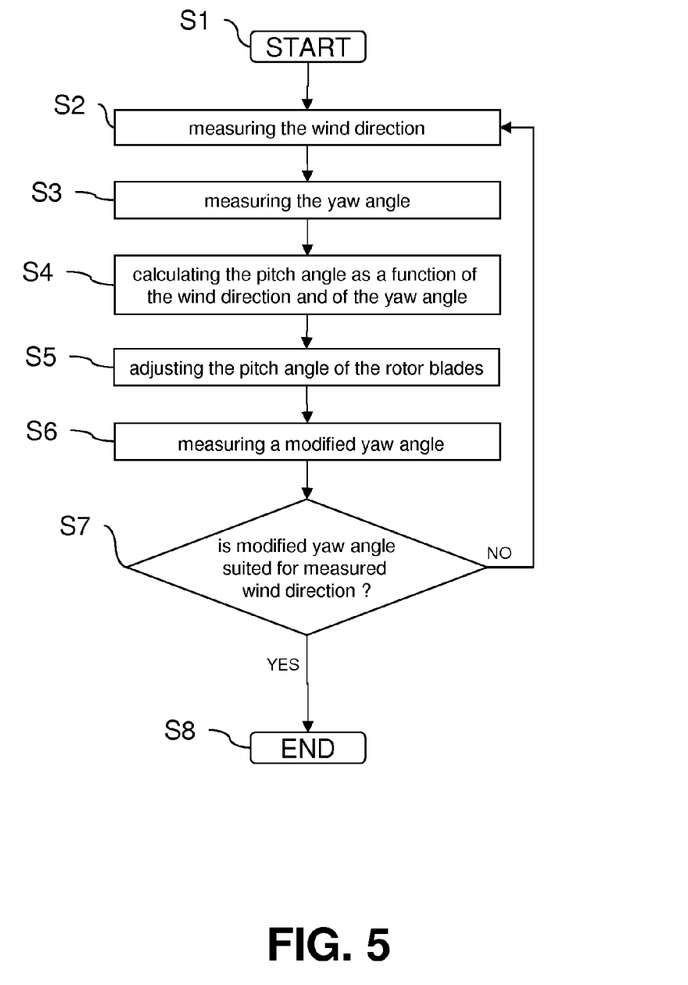
FIG. 5 is a flow chart of a method for the adjusting the yaw angle of a wind turbine as a function of an actual wind direction and an actual yaw angle, the method being performed by an apparatus shown in FIG. 3.

FIG. 5 is a flow diagram of a method for adjusting the yaw angle of a wind turbine, wherein the method is performed in an apparatus shown in FIG. 3. At step S1 the procedure is started. At step S2 the wind direction is measured by the wind direction sensor 201 shown in FIG. 3. Then the operation proceeds to a step S3, where the yaw angle, i.e. the actual yaw angle is measured by the yaw angle sensor 202 shown in the sensor device 200 of FIG. 3. From the measured yaw angle and the measured wind direction (steps S2 and S3), at step S4, the pitch angle 108 is calculated by means of the processing unit 401 shown in FIG. 3. In a typical embodiment, the steps S2 and S3 are carried out in once in that the wind direction sensor 201 outputs the deviation between the wind direction and the actual orientation of the nacelle axis. The pitch angle 108 is such that a desired yaw momentum 107 is provided in order to rotate the machine nacelle 103 into an appropriate position with respect to the wind direction 105.

Then the operation proceeds to a step S5 where the pitch angle of the rotor blades is adjusted in accordance with the pitch angle control signal 508 provided by the processing unit 401. The modification of the pitch angle 108 of the rotor blades results in an additional yaw momentum 107 such that the yaw angle 106 is modified in a desired manner. At step S6 a modified yaw angle is measured. It is noted that a yaw angle adjustment may be provided using either a yaw momentum generated by the yaw angle adjustment unit 302 in combination with a yaw momentum generated by an appropriate pitch angle adjustment or by a yaw momentum generated by an appropriate pitch angle adjustment alone.

The operation proceeds to a step S7 where it is determined, whether the modified yaw angle is suited for the measured wind direction or not. In other words, at step S7 it is determined whether the orientation of the wind turbine with respect to the wind direction 105 at the location of the wind turbine 100 is adapted for maximum energy conversion efficiency (conversion of wind energy to electrical energy, FIG. 1).

If it is determined at step S7 that the modified yaw angle is not suited for the measured wind direction ("NO"), the operation proceeds to step S2 mentioned above. Afterwards the steps S2 to S6 are repeated and a further determination is performed at step S7.

If it is determined at step S7 that the modified yaw angle is suited for the measured wind direction ("YES") the operation proceeds to a step S8 where the procedure is ended.

Figure 6:
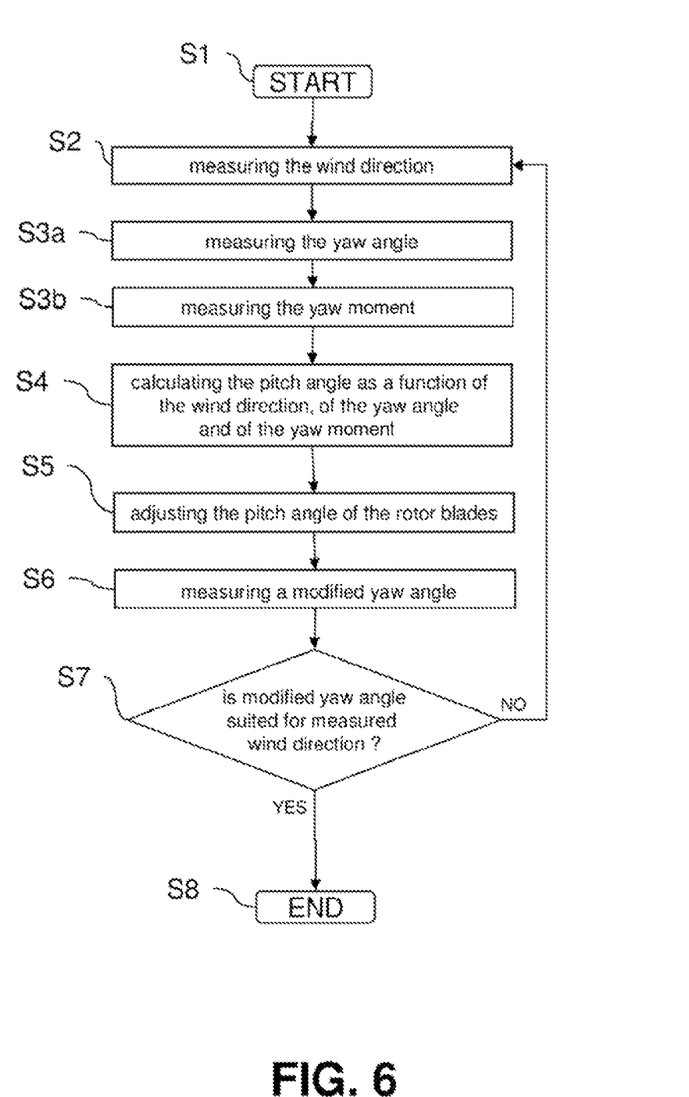
FIG. 6 is a flow chart showing a method for adjusting the yaw angle as a function of the actual wind direction, the actual yaw angel and a yaw momentum measured by a yaw momentum sensor, the method being performed by an apparatus shown in FIG. 4.

FIG. 6 is a flow diagram of a method for adjusting the yaw angle of a turbine, wherein the method is performed using an apparatus which has been described above and which is shown in FIG. 4. As compared to the method depicted in FIG. 5 the step S3 is divided into two separate sub-steps S3a and S3b such that besides the yaw angle (step S3a), the yaw momentum is measured in a step S3b.

Thus after the start of the procedure at step S1, the wind direction is measured in step S3 as before. Then the yaw angle and the yaw momentum are measured in steps S3a and S3b. Then the operation proceeds to step S4, where the pitch angle is calculated as a function of the wind direction, which has been determined in step S2, as a function of the yaw angle, which has been determined in step S3a, and as a function of the yaw momentum, which has been determined in the step S3b.

Then the operation proceeds to step S5, where the pitch angle of the rotor blades is adjusted in accordance with the measured parameters. As a result, a modified yaw angle is provided, and this yaw angle is measured at step S6. In step S7 it is determined whether the modified yaw angle is suited for the measured wind direction or not. If the modified yaw angle is not suited for the measured wind direction ("NO"), the operation proceeds to step S2 described above. Then the steps S2, S3a, S3b, S4, S5 and S6 explained above are repeated.

If it is determined at step S7, that the modified yaw angle is suited for the measured wind direction, i.e. the rotational position of the wind turbine about the central axis of the tubular tower 102 is such that maximum wind energy may be converted ("YES"), the operation proceeds to step S8 and is ended.

In addition to the steps described above with reference to FIGS. 5 and 6, the method for adjusting the yaw angle 106 from an actual yaw angle to a desired yaw angle comprises the step of determining a yaw mode as a function of the measured wind direction 105, a measured wind speed and the measured yaw angle 106.

According to another embodiment the yaw mode is at least one of (i) a no-yaw-adjustment-mode, wherein the yaw angle 106 is not adjusted, (ii) a delayed-yaw-adjustment-mode, wherein the yaw angle 106 is adjusted a predetermined time delay after the wind direction 105, the wind speed and the yaw angle 106 have been measured, (iii) a fixed-pitching-mode, wherein a pitch angle 108 of the at least one rotor blade is fixed and a yaw momentum 107 is generated by a wind resistance force of the at least one rotor blade, for changing the yaw angle 106 from the actual yaw angle to the desired yaw angle, and (iv) a normal yaw mode, wherein a pitch angle 108 of the at least one rotor blade is calculated as a function of the measured wind 105 direction and the measured yaw angle, and the pitch angle 106 of the rotor blades is adjusted according to the calculated pitch angle such that a yaw momentum 107 is generated for changing the yaw angle from the actual yaw angle to the desired yaw angle.

The normal yaw mode (iv) may be supported by driving at least one yaw motor and/or at least one yaw brake of the wind turbine in order to provide a high-speed-yaw-mode.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for adjusting a yaw angle of a wind turbine from an actual yaw angle to a desired yaw angle, the wind turbine comprising a rotor comprising a plurality of rotor blades attached to a hub, the method comprising:
    measuring a wind direction at a location of the wind turbine;
    measuring a yaw angle of the wind turbine;
    calculating a set signal for a yaw angle modification as a function of the measured wind direction and the measured yaw angle;
    measuring a yaw momentum of the wind turbine;
    calculating a pitch angle of the rotor blades as a function of the set signal and the measured yaw momentum; and
    adjusting the pitch angle of the rotor blades according to the calculated pitch angle such that a yaw momentum is generated for changing the yaw angle from the actual yaw angle to the desired yaw angle.

2. The method in accordance with claim 1, wherein the step of calculating the set signal for the yaw angle modification is based on the determination of an angle difference between the measured wind direction and the measured yaw angle of the wind turbine or a measured relative wind direction at a nacelle of the wind turbine.

3. The method in accordance with claim 1, wherein the step of calculating the set signal for the yaw angle modification and the step of calculating the pitch angle of the rotor blades as a function of the set signal and the measured yaw momentum is performed by means of one single processing unit.

4. The method in accordance with claim 1, wherein the adjustment of the pitch angle of each rotor blade is dependent on a rotational position of the each rotor blade.

5. The method in accordance with claim 1, wherein the adjustment of the pitch angle of the plurality of rotor blades is performed independently for each rotor blade.

6. The method in accordance with claim 1, wherein the adjustment of the pitch angle of the plurality of rotor blades is performed with respect to an incoming wind direction measured by a wind direction sensor.

7. The method in accordance with claim 1, wherein the change of the yaw angle is supported by driving at least one yaw motor and at least one yaw brake of the wind turbine.

8. The method in accordance with claim 1, wherein a yaw momentum of the wind turbine is compensated by the adjustment of the pitch angle of at least one of the plurality of rotor blades.

9. A wind turbine comprising a rotor comprising a plurality of rotor blades attached to a hub, said wind turbine further comprising:
    a sensor device configured to measure a wind direction at a location of the wind turbine;
    a first processing unit configured to calculate a set signal for a yaw angle modification from an actual yaw angle to a desired yaw angle as a function of the measured wind direction and at least one of the actual yaw angle and a wind direction relative to a nacelle orientation of the wind turbine;
    a second processing unit configured to calculate a pitch angle control signal for a pitch adjustment as a function of the set signal and a measured actual yaw momentum; and an actuator device configured to adjust a pitch angle of at least one of the plurality of rotor blades as a function of the pitch angle control signal such that a yaw momentum is generated for changing the yaw angle from the actual yaw angle to the desired yaw angle.

10. The wind turbine in accordance with claim 9, wherein the sensor device comprises a yaw angle sensor for measuring the actual yaw angle.

11. The wind turbine in accordance with claim 10, wherein the sensor device further comprises a yaw momentum sensor for providing the measured actual yaw momentum.

12. The wind turbine in accordance with claim 9, further comprising a pitch control unit configured to supply a pitch angle driver signal as a function of the control signal for the actuator device in order to control the pitch angle of the rotor blades.

13. The wind turbine in accordance with claim 11, wherein the actuator device comprises a yaw angle adjustment unit for adjusting the yaw angle in cooperation with the actual yaw momentum.

* * * * *